(12) United States Patent
Wehrum et al.

(10) Patent No.: US 6,929,742 B2
(45) Date of Patent: Aug. 16, 2005

(54) FINE FILTER FOR A FUEL FEED UNIT

(75) Inventors: Bernrd Wehrum, Rotenburg (DE); Gerd Weise, Alheim-Heinebach (DE)

(73) Assignee: Siemens Aktiengesellschaft, Munich (DE)

( * ) Notice: Subject to any disclaimer, the term of this patent is extended or adjusted under 35 U.S.C. 154(b) by 51 days.

(21) Appl. No.: 10/120,148

(22) Filed: Apr. 11, 2002

(65) Prior Publication Data

US 2002/0166809 A1 Nov. 14, 2002

(30) Foreign Application Priority Data

Apr. 11, 2001 (DE) .......................................... 101 18 050

(51) Int. Cl.$^7$ ............................................... B01D 35/06
(52) U.S. Cl. ................. 210/257.1; 210/258; 210/416.4; 210/452; 210/487; 210/493.1; 210/495; 210/497.01
(58) Field of Search ............................. 210/416.4, 487, 210/495, 497.01, 497.3, 342, 452, 493.1, 497.2, 257.1, 258, 497.1

(56) References Cited

U.S. PATENT DOCUMENTS

| 1,639,170 A | * 8/1927 | Fell .............................. 210/440 |
| 1,647,799 A | * 11/1927 | Hammer ....................... 210/440 |
| 5,392,750 A | 2/1995 | Laue et al. |

FOREIGN PATENT DOCUMENTS

| DE | 195 01 353 | 7/1996 |
| DE | 198 48 571 | 5/2000 |
| JP | 63-306271 | 12/1988 |
| WO | WO 99/10075 | 3/1999 |

\* cited by examiner

Primary Examiner—Matthew O. Savage
(74) Attorney, Agent, or Firm—Morrison & Foerster LLP

(57) ABSTRACT

In the case of a fine filter for a fuel feed unit of a motor vehicle, a filter element has at least two sections which surround the fuel feed unit concentrically. In the fitted state of the fine filter, the sections are fastened to the fuel feed unit and to a surge chamber. The filter element has proven particularly cost-effective and enables the use of a particularly small mesh width while requiring little space.

7 Claims, 2 Drawing Sheets

FINE FILTER FOR A FUEL FEED UNIT

CLAIM FOR PRIORITY

This application claims priority to Application No. 10118050.0 which was filed in the German language on Apr. 11, 2001.

TECHNICAL FIELD OF THE INVENTION

The invention relates to a fine filter for a fuel feed unit of a motor vehicle with a filter element, and in particular, to a fine filter having a device for fastening the filter element to the fuel feed unit and to a surge chamber surrounding the fuel feed unit.

BACKGROUND OF THE INVENTION

Fine filters are frequently used in motor vehicles today, in particular with two-stage fuel feed units, and are known in practice. As a rule, the first stage of the fuel feed unit feeds fuel from a fuel tank via a preliminary filter into the upper region of the surge chamber. The second stage of the fuel feed unit feeds the fuel from the lower region of the surge chamber to an internal combustion engine of the motor vehicle. In this case, the fine filter is arranged in the central region of the surge chamber and has a housing which has the fuel flowing axially through it and has the filter element arranged in it. The disadvantage of the conventional fine filter is that it is very costly to construct and requires a large amount of space. The filter therefore requires a very large surge chamber. This results in a very cost-intensive construction of the surge chamber and of the fine filter.

In one construction, the fine filter annularly surrounds the fuel feed unit and is fastened to the bottom of the surge chamber. This fine filter has small dimensions, but is not able to filter the fuel in a sufficient and long-lasting manner. In order to avoid rapid clogging of the fine filter with dirt particles, the filter element therefore has a mesh width of 40–80 $\mu$m as a rule.

SUMMARY OF THE INVENTION

The invention discloses configuring a fine filter such that it can be produced particularly cost-effectively and permits the use of filter elements having a particularly small mesh width.

According to one embodiment of the invention, this problem is solved in that the filter element is of annular configuration and is provided for fastening to circumferential surfaces of the fuel feed unit and of the surge chamber and has at least two sections which are aligned essentially axially and are arranged concentrically with the axis of symmetry.

The configuration enables the filter element to be fastened directly to the surge chamber and to the fuel feed unit. The fine filter according to the invention therefore does not require a cost-intensive and spacious housing. The fine filter according to one embodiment of the invention can therefore be manufactured particularly cost-effectively. The sections facing in the axial direction lead to the filter element having a particularly large surface and therefore to it having a particularly low susceptibility to becoming choked up. A further advantage of the invention resides in the fact that the fine filter according to the invention can be used even when the surge chamber has small dimensions and therefore even with very confined fuel tanks.

In order to further reduce the manufacturing costs of the fine filter according to the invention, it is preferable if the filter element is of V-shaped configuration in an axial sectional plane. The fine filter also has great stability as a result.

According to another embodiment of the invention, large quantities of the dirt particles retained by the filter element can collect in a simple manner in a small subregion of the filter element if the filter element is of essentially U-shaped configuration in an axial sectional plane.

According to another embodiment of the invention, the filter element can have a particularly large surface or have particularly small dimensions if the sections of the filter element are of sleeve-shaped configuration and are arranged concentrically about its axis of symmetry, and if in each case two sections are connected to each other by means of an annular disk-shaped section.

In order to further enlarge the surface of the filter element it is preferable, according to another embodiment of the invention, if a plurality of sections surround one another concentrically.

The fine filter according to the invention has proven to be particularly simple in terms of structure and can be fitted with little expense if the filter element is manufactured from a material or a plurality of material layers having a designated stability and on its edges has means for fastening to the surge chamber or to the fuel feed unit.

According to still another embodiment of the invention, the fuel feed unit is protected in a particularly reliable manner against contamination and therefore against wear if the filter element has a mesh width of 15 $\mu$m. In contrast to the filter element of the known fine filter having a mesh width of 40–80 $\mu$m, this leads to a particularly fine filtering of the fuel.

BRIEF DESCRIPTION OF THE DRAWINGS

The invention permits numerous embodiments. In order to further clarify its basic principle, two of these are illustrated in the drawing and will be described below. In the drawings.

DETAILED DESCRIPTION OF THE PREFERRED EMBODIMENTS

Figure 1:
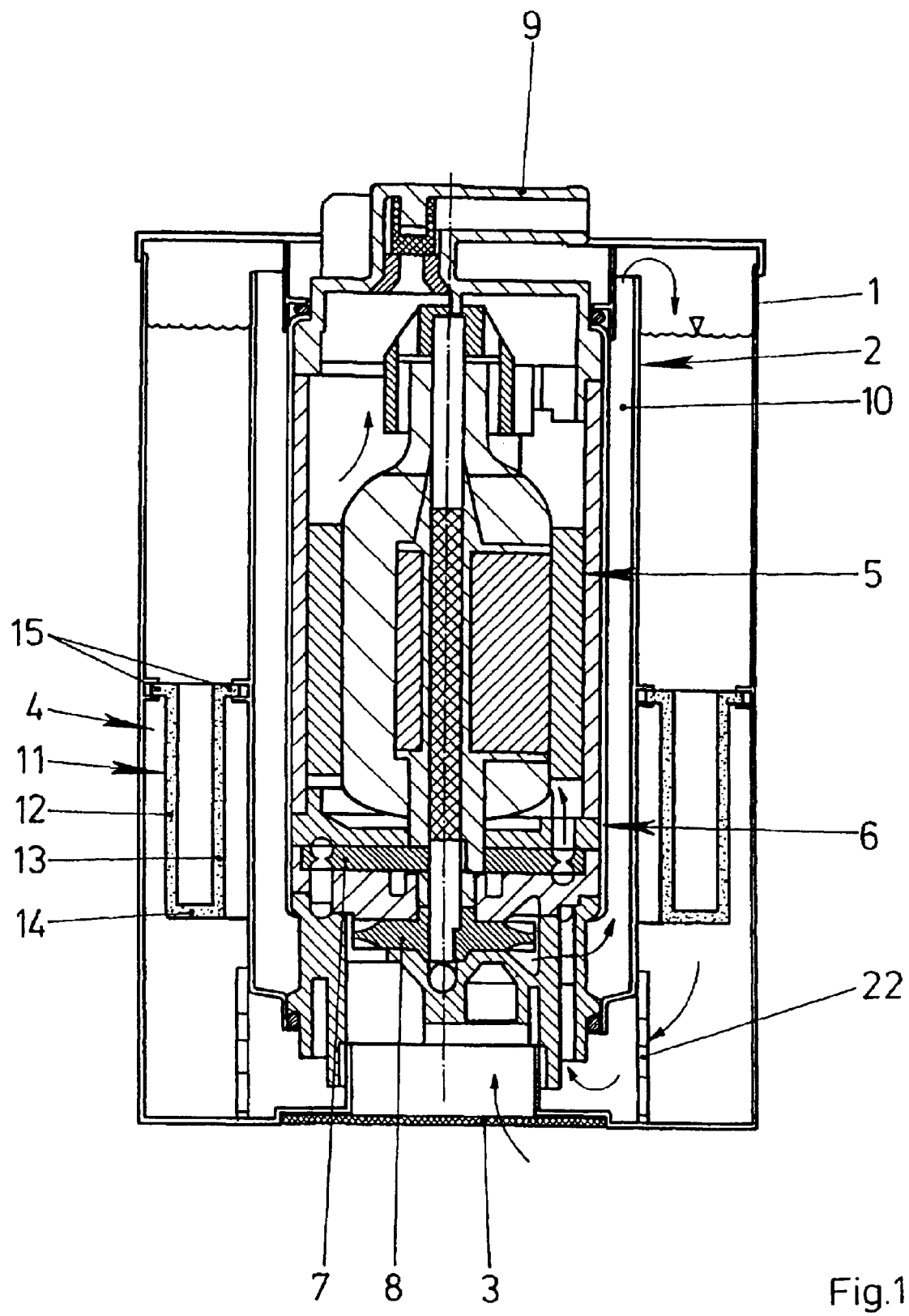
FIG. 1 shows a sectional illustration through a fuel feed unit which is fitted in a surge chamber and has a fine filter according to the invention.

FIG. 1 shows a fuel feed unit 2 which is arranged in a surge chamber 1 and has a preliminary filter 3 arranged in the bottom region of the surge chamber 1 and a fine filter 4 arranged in the surge chamber 1. The fuel feed unit 2 has a feed pump 6 which is driven by an electric motor 5 and has two impellers 7, 8 and a connection piece 9 on its upper side. A forward-flow line leading to an internal combustion engine (not illustrated) of a motor vehicle is connected to the connection piece 9. During driving of the lower of the impellers of the feed pump 6 fuel is sucked up through the preliminary filter 3 and is supplied via a rising pipe 10 to the upper region of the surge chamber 1. The fuel subsequently flows through the fine filter 4 to the upper of the impellers 7. It is fed from there through the electric motor 5 to the connection piece 9. For clarification purposes, the fuel flows are indicated in the drawing by arrows. The fuel feed unit 2 is fastened in the surge chamber 1 by a pump bracket 22.

The fine filter 4 has a filter element 11 which surrounds the fuel feed unit concentrically and is fastened to the inner wall of the surge chamber 1. The filter element 11 is of U-shaped configuration in longitudinal section and has two sleeve-shaped sections 12, 13 arranged concentrically with the axis of symmetry. The sections 12, 13 are connected to each other at their lower end by an annular disk-shaped section 14. At their upper ends, the sleeve-shaped sections 12, 13 have horizontal edges 15 with which they are connected in a sealing manner to the fuel feed unit 2 and to the surge chamber 1.

Figure 2:
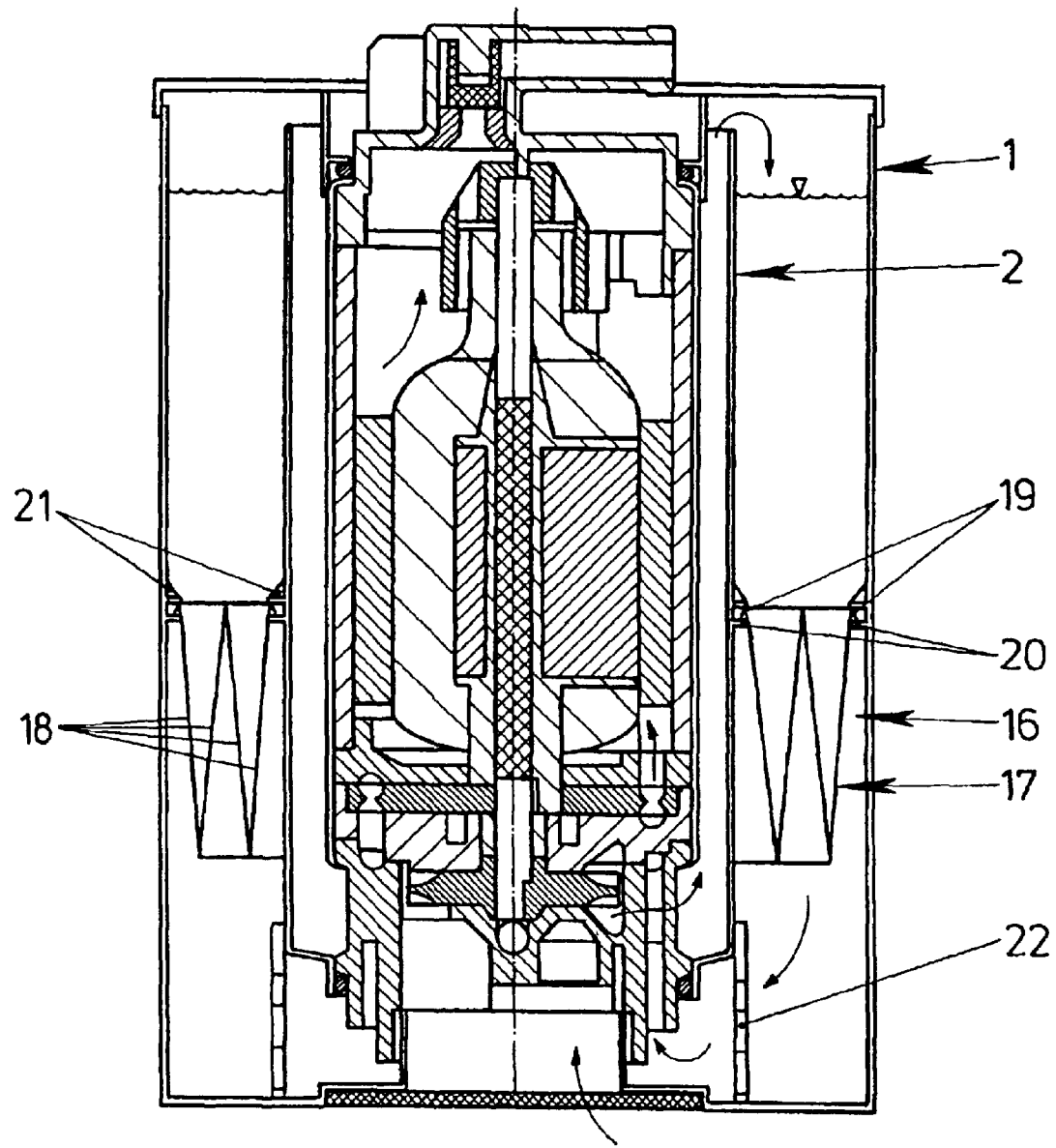
FIG. 2 shows the surge chamber having the fuel feed unit from FIG. 1 together with a further embodiment of the fine filter according to the invention.

FIG. 2 shows the fuel feed unit 2 and the surge chamber 1 from FIG. 1 together with a fine filter 16, in which a filter element 17 has a plurality of sections 18 arranged in a V shape. The sections 18, which are arranged in a V-shaped manner with respect to one another, surround one another concentrically. Radially on the inside and outside, the fine filter 16 has edges 19 in each case for fastening it to the fuel feed unit 2 and to the surge chamber 1. The fuel feed unit 2 and the surge chamber 1 each have a supporting edge 20, for supporting the edges 19, and ramps 21 for gripping behind the edges 19. When the fine filter 16 is installed, the edges 19 are moved in the radial direction by the ramps 21. The edges 19 subsequently snap into the indicated position behind the ramps 21.

What is claimed is:

1. A fine filter including a fuel feed unit of a motor vehicle with a filter element and a pump, comprising:

a device to fasten the filter element to the fuel feed unit and to a surge chamber which surrounds the fuel feed unit; and a preliminary filter connected to a lower part of the pump and supplied fuel via a rising pipe, wherein the filter element is in an annular configuration and is provided to fasten to circumferential surfaces of the fuel feed unit and the surge chamber and has at least two sections which are essentially aligned axially and are arranged concentrically with an axis of symmetry, and the fuel feed unit including the feed pump having first and second impellers, the first impeller drawing the fuel through the preliminary filter and pumping the fuel upwardly through the rising pipe into an upper portion of the surge chamber, the fuel traveling downwardly from the upper portion of the surge chamber and through the fine filter to the second impeller of the pump.

2. The fine filter as claimed in claim 1, wherein the filter element is a V-shaped configuration in an axial sectional plane.

3. The fine filter as claimed in claim 1, wherein the filter element is essentially a U-shaped configuration in an axial sectional plane.

4. The fine filter as claimed in claim 1, wherein the sections of the filter element are in a sleeve-shaped configuration and are arranged concentrically about its axis of symmetry, and at least two of the sections are connected to each other by an annular disk-shaped section.

5. The fine filter as claimed in claim 1, wherein a plurality of axial sections surround one another concentrically.

6. The fine filter as claimed in claim 1, wherein the filter element comprises a material or a plurality of material layers having a designated stability and on its edges has a second device to fasten to the surge chamber or to the fuel feed unit.

7. The fine filter as claimed in claim 1, wherein the filter element has a mesh width of 15 $\mu$m.

\* \* \* \* \*